ively high purity and relatively free of solids
UNITED STATES PATENT OFFICE 2,564,367

FLOTATION OF PHOSPHATE AND SIMILAR ORES

Ira M. Le Baron, Lakeland, Fla., and Paul D. V. Manning, Glencoe, Ill., assignors to International Minerals & Chemical Corporation, a corporation of New York No Drawing. Application September 11, 1947, Serial No. 773,504

9 Claims. (Cl. 209—166)

This application is a continuation-in-part of application Ser. No. 722,296 filed Jan. 15, 1947, now abandoned.

The present invention relates to the process of beneficiating or concentrating ores. More particularly, the process of the present invention relates to the beneficiating or concentrating of phosphatic ores, or phosphorous-containing materials. In general, the process of the present invention is applicable to beneficiation of any non-metallic ore such as, for example, apatite, fluorapatite, sylvite, langebeinite, fluorspar, feldspar, and the like.

Appatite and fluorapatite, which are the crude phosphatic materials or minerals, occur widely in nature and are generally thought to be chiefly tricalcium phosphate coupled with other minerals such as quartz, silicates, calcium carbonate, and the like, all of which, of course, contain no phosphorus and are of little, if any, nutritive value so far as plants and animals are directly concerned. Such materials, in addition, contain traces of minor quantities of heavy metals, heavy metal salt oxides such as ferric oxide, aluminum, and the like. Many methods have been devised in the past for treating such ores to effect beneficiation or concentration of the phosphatic constituents of apatite, fluorapatite, and the like, while removing therefrom the siliceous, carbonaceous and heavy metal constituents therefrom. Several methods involve the desliming, dewatering and separation of either pulped or unpulped material in order to effect this beneficiation and concentration. One commonly used method involves the reagentizing of such dewatered ore with a collecting agent used in conjunction with a relatively high boiling hydrocarbon oil or liquid, together with the use of a basic component such as caustic. When an aqueous suspension or pulped phosphatic rock is reagentized with a composition containing this combination and the same agitated and aerated in an aqueous suspension, the phosphatic values and components of the rock are found to rise and become segregated in the upper portion of such suspension while the siliceous values are found to settle or deposit in the lower portion of such a suspension. The beneficiated or enriched phosphatic material is withdrawn and further treated by reflotation for further beneficiating of the phosphatic ore, and the material so segregated is either subjected to acid treatment for the production of superphosphate, or is ground and sold as raw, enriched phosphate rock having from 60% to 75%, and even as high as 80%, of tricalcium phosphate computed as bone phosphate of lime.

In such a process, however, it has been recognized that the collecting agents heretofore and presently employed in the reagentizing step are expensive and in many instances require greater quantities of material than is economically feasible. Because of the bulky character of the business of producing phosphate rock concentrates, and the highly competitive market existing in such a business, great effort has been expended to discover collecting agents which will be more efficacious, yet which may cost even less than those heretofore employed. It is not alone desirable to employ a collector which may be used in smaller quantities to effect an efficient segregation of the phosphatic values, but it is also necessary that the values recovered be of a relatively high purity and relatively free of solids other than the desired phosphatic material. To this end, the following invention is directed.

It is an object of the present invention to provide an improved process of concentrating or beneficiating ores.

It is a further object of this invention to provide an improved process for concentrating or beneficiating phosphatic ores.

It is a further object of the present invention to provide an improved process of concentrating or beneficiating phosphatic ores by the froth flotation method in which the reagent added for this purpose has frothing as well as collecting characteristics.

It is a further object of this invention to provide an improved process for the beneficiating or concentrating of phosphatic ores in which the reagent added for the froth flotation or collecting step has improved characteristics as to the froth breaking after the flotation step has been completed.

It is a still further object of this invention to provide an improved process for the beneficiating or concentrating of phosphatic ores or phosphorus-bearing materials wherein such material is reagentized. In addition, it is an object of this invention to provide an improved reagentizing composition which will give an improved recovery of the phosphatic values of the ore or rock, while at the same time requiring a lesser quantity of the reagent than has heretofore been customarily used of the reagent to accomplish the same or better recovery of the B. P. L. content of the ore or rock.

Still further objects of the invention will be apparent upon a more complete understanding of the invention as hereinafter more fully described.

The reagentizing of phosphatic ores or phosphorus-bearing materials for the purpose of beneficiating or concentrating these phosphatic values has been practiced for many years. The present invention is directed to the discovery of and use of an improved reagentizing composition for this purpose. Once the phosphatic material, such as Florida pebble phosphate rock or any other phosphatic rock such as Montana or Tennessee rock, has been sized to about −1 mm. more or less, and if desired, washed with water to remove slimes and dewatered in a classifier to separate water from the rock, the material is reagentized with the novel composition herein outlined. It has been discovered that the humin produced in the acid hydrolysis of at least one crude protein, or mixtures thereof, and which is removed as a precipitate from the crude hydrolysate contains certain beneficial values which are the subject matter of this invention. It is not known exactly what the specific chemical constitution of these values are. However, it has been discovered that the humin does accomplish the desired results for the beneficiation of phosphatic materials when used in conjunction with other substances conventionally employed in such reagentizing operations.

The term "crude protein" is used herein and in the appended claims to distinguish from protein which has been purified by various physical and/or chemical means which are familiar to persons skilled in the protein and amino acid arts. Such "purified" proteins produce mixtures of amino acids upon hydrolysis which are essentially free from contaminating substances. In contradistinction, the term "crude protein" as used herein excludes the aforementioned "pure" proteins, but does include all crude or impure proteins such as those which arise as by-products in the meat packing, leather, starch, cereal, vegetable oil, and other industries. The following examples are considered to be merely exemplary, and not all inclusive, of the types of "crude protein" which are applicable for the production of humin, which is the essential reagentizing composition in the instant novel process.

*Animal protein.*—Meat fibre, meat residues, fish meal, bone meal, milk protein, casein, blood, and others.

*Vegetable protein.*—Wheat gluten, corn gluten, soyabean gluten, flaxseed, cottonseed, peanut cake, zein, cereals and grains, and others.

Such protein material is, at present, either discarded by the respective industries, or is processed to produce animal or plant foods.

The humin required as a reagentizing composition in the instant process may be produced either by acid hydrolysis of any one of the above mentioned crude protein materials or by acid hydrolysis of various combined mixtures thereof. The humin may be used directly as it comes from the filters in the acid hydrolysis of crude protein. However, because of the bulkiness of this product, it is economical and expedient, so far as results are concerned, to prepare either an aqueous or organic extract of the humin, or the concentrate or residue of such extracts. These extracts may be used as such, or the solvent may be driven off leaving a residue which is substantially solvent free extract or residue, said residue then being used in the reagentizing composition. Distillates of humin, prepared according to procedures hereinafter described, may also be employed. Of course, the more concentrated the desired values of the humin cake are, the less the amount required to accomplish the desired results in the separation of the phosphatic values from the reagentized phosphatic material.

Any of the conventional organic solvents appear to be satisfactory in preparing the extract or concentrate therefrom for use in the reagentizing of phosphatic material. Thus, for example, all aliphatic ethers such as diethyl ether, diisopropyl ether, the lower aliphatic alcohols such as methyl alcohol, ethyl alcohol, normal propyl alcohol, isopropyl alcohol, and the various butyl alcohols, the petroleum solvents such as petroleum ether, paper and varnish makers naphtha, kerosene, Diesel oil, fuel oil, and the like, may be used. In addition, such solvents as carbon tetrachloride, the chlorbenzenes, B, B-dichlor-diethyl ether, and the like, may also be employed. In fact, any of the common, conventionally used organic solvents seem to produce an extract from the humin cake containing the desired values. Water may be used as the solvent but the resultant extract is not as satisfactory for the purpose of the present invention as is the extract using the organic solvents above stated.

In addition to the essential values of the humin cake, the reagentized composition also contains a basic material such as caustic soda, soda ash, KOH, or the like, in order to regulate the pH of the suspension or pulped slurry used up to 7.0, preferably between about 8.0 and about 9.0. Still a third component of the reagentized composition is a liquid hydrocarbon component which is a liquid under the conditions obtaining. Suitable substances in this category are Diesel oil, fuel oil, kerosene, the heavier solvent naphthas, crude oil, and the like.

Each of the three above specified components of the reagentized composition may be added separately or they may be added as a previously prepared admixture to the dewatered phosphatic material. Also, it is possible to obtain substantial results in beneficiating the phosphatic rock or ore if the hydrocarbon component of the reagentizing composition is omitted entirely. A typical composition may be prepared in the following manner, the amounts being in pounds per ton of dewatered ore treated:

A. (1) Wet humin cake of 50% to 60% water content or the cake may be of substantially anhydrous character in an amount between about 0.5 and about 3.0, preferably between about 1.5 and about 2.5, all on a dry basis. (2) Alcoholic extract of humin cake in an amount between about 0.2 and about 3.0, preferably between about 0.75 and about 2.0.

B. Diesel or fuel oil in conventional amounts, usually between about 0.1 and about 6.0.

C. Caustic soda or any other suitable basic material in conventional amounts, usually between about 0.2 and about 1.5.

A phosphatic rock reagentized with a composition as above described may be subjected to a separation or segregation step, or sequence of such steps, in a number of ways, all of which effect a marked beneficiation or concentration of the desired phosphatic values of the ore. Such a reagentized feed may be slurried in water to form an aqueous suspension, allowing the froth layer and agglomerate layer to collect at the top of the flotation cell with the siliceous and other impurities and less desired values sinking to the bottom of such cell, in which case the floated phosphatic values are segregated from the siliceous bodies and the like. The concentrate or partially concentrated phosphatic material may then be subjected to still a further flotation or series of flotation steps employing the same reagentizing composition or a different one to further beneficiate phosphatic values. One of the advantages in the use of the instant reagentizing composition is that it is easily broken up and defrothed after flotation has been completed. This is accomplished by treating the floated phosphatic values with sulfuric acid to remove the oil and other reagents adhering to the phosphatic values. Lesser quantities of sulfuric acid, or any other mineral acid such as hydrochloric acid, are required in breaking the coatings on the phosphatic values than is the case when using the reagentizing compositions heretofore employed.

The further concentration and beneficiation of the phosphatic values segregated in the froth layer of the flotation cell may be treated as above stated in the conventional manner to effect the desired degree of concentration of the B. P. L. (bone phosphate of lime) content of the material.

The novel reagentizing composition may also be appleid in processes designed to beneficiate or concentrate phosphatic ores and other non-metallic ores previously mentioned in which flotation steps are not involved. Thus, for example, the reagentized phosphatic feed either has an original or intermedaite step in the beneficiation, may be subject to a tabling operation of conventional construction to allow a collection and segregation of phosphatic material on the one hand, and siliceous and heavy mineral bodies on the other hand. Also, it has been discovered that phosphatic material reagentized with the novel composition herein discussed may be successfully beneficiated as to its phosphatic content by conducting such reagentized feed in a downwardly spiraling path so as to permit the phosphatic material to be selectively centrifugally moved to the outer side of the spiral pathway, while the siliceous bodies and other impurities are collected from the inner portion of the spiral pathway.

As illustrative of the character of the instant invention, but in no wise intending to be limited thereby, the following examples are described:

EXAMPLES

In the following examples, each run was carried out under the same set of standard conditions of treatment and involved the same amounts of ore or rock, and the like, and except as indicated in the table, all conditions, reagents, and treatments remained constant so that a set of strictly comparable results were obtained with the exceptions noted in the table.

In each instance 1000 grams of Florida pebble rock of about −28 mesh was deslimed and dewatered to about 70–80% solids, placed in a mixing chamber with reagent, and agitated for about one minute. The treated mixture was then diluted with water, placed in a flotation cell and agitated for about two minutes with the various types of reagents in the amounts specified below:

TABLE I

*Humin obtained by acid hydrolysis of wheat gluten*

| Example No. | I | II | III | IV |
|---|---|---|---|---|
| Type Used (Collector) | Humin Cake | Solvent Free Alcohol Extract of Humin Cake | 2 lbs. Petroleum Distillate, 3 lbs. Humin Cake | Crude Tall Oil |
| Reagent, lbs. per ton: | | | | |
| Collector | ¹3.0 | 0.3 | 5.0 | 0.5. |
| Petroleum Oil | 3.0 | 3.0 | 3.0 | 3.0. |
| Caustic Soda | 0.5 | 0.5 | 0.5 | 0.5. |
| B. P. L. in Feed, Weight Per Cent | 29.6 | 29.6 | 29.6 | 29.6. |
| Product: | | | | |
| Recovered, Weight Per Cent | 34.0 | 36.7 | 34.4 | About that of II. |
| B. P. L., Weight Per Cent | 72.16 | 71.46 | 70.23 | Do. |
| B. P. L., of Tails, Weight Per Cent | 6.73 | 4.92 | 7.71 | Do. |
| B. P. L., Recovery, Weight Per Cent | 84.0 | 89.4 | 83.7 | Do. |

¹ 50% H₂O.

Example IV is presented to show a comparison of the effectiveness of humin cake alcoholic extract for reagentizing phosphatic ore with crude tall oil, a conventionally used reagent for the same purpose. It is noted that substantially the same degree of beneficiation is attained with the alcoholic extract in only 0.3 lb. per ton as is crude tall oil used in an amount of 0.5 lb. per ton.

TABLE II

*Reagent.—Solvent free extracts of humin cake from corn gluten hydrolysates.*

| Example No. | V | VI | VII | VIII |
|---|---|---|---|---|
| Type Used (Collector) | Alcohol Extract | Alcohol Extract | Benzene Extract | Crude Tall Oil |
| Reagent lbs. per ton: | | | | |
| Collector | 0.35 | 0.344 | 0.505 | 0.5 |
| Petroleum oil | 3.0 | 3.0 | 3.0 | 3.0 |
| Caustic soda | 0.5 | 0.5 | 0.5 | 0.5 |
| B. P. L. in Feed, Weight Per Cent | 31.9 | 32.0 | 32.2 | 29.6 |
| Product: | | | | |
| Recovered, Weight Per Cent | 39.0 | 38.2 | 33.2 | 34.0 |
| B. P. L., Weight Per Cent | 68.21 | 70.63 | 72.8 | 72.16 |
| B. P. L., of Tails, Weight Per Cent | 4.21 | 4.81 | 8.91 | 6.73 |
| B. P. L., Recovery, Weight Per Cent | 92.5 | 91.3 | 82.3 | 84.0 |

Example VIII is identical with Example IV and is reproduced for purposes of comparison. The advantages of employing the alcoholic extracts are immediately apparent and the benzene extract produces approximately the same degree of beneficiation as does the tall oil reagent compositions.

The "humin distillate" mentioned previously herein and in the appended claims is a liquid or semi-liquid composition which is obtained by subjecting the humin, obtained according to previously described procedures, to a distillation in a conventional type of still at temperatures up to about 700° C. Such distillation is preferably carried out in the absence of air or in substantially inert atmosphere, and at either atmospheric or reduced pressures. The amount of distillate obtained in any particular distillation will depend upon the temperature of the still, the pressure of the system, the efficiency of condensing unit which cools the distillate, and upon the particular humin being distilled. On distilling some types of humin derived from acid hydrolysis of wheat gluten, as much as 75% of the humin is recovered as distillate when the distillation is conducted in vacuo up to a temperature of 700° C., and the use of steam is sometimes helpful in obtaining a maximum yield of distillate.

The distillates usually contain water which may or may not be removed prior to using the distillates as ore beneficiation reagents.

In the following examples, each run was carried out employing the procedures of Examples I to VIII.

TABLE III

*Humin distillate obtained by subjecting humin, obtained by acid hydrolysis of wheat gluten, to a distillation to temperature up to 700° C., in vacuo*

| Example No. | IX | X | XI |
|---|---|---|---|
| Type Used (Collector) | Humin Distillate | Humin Distillate | Crude Tall Oil |
| Reagent, lbs. per ton: | | | |
| Collector | 0.36 | 0.5 | 0.5 |
| Petroleum oil | 3.0 | 3.0 | 3.0 |
| Caustic soda | 0.5 | 0.5 | 0.5 |
| B. P. L. in Feed, Weight Per Cent | 29.6 | 29.6 | 29.6 |
| Product, B. P. L., Recovery, Weight Per Cent | 89.9 | 92.0 | 84.0 |

Example XI is identical to Example VIII and is reproduced for purposes of comparison.

Having now thus fully described and illustrated the invention, what is desired to be secured and claimed by Letters Patent is:

1. The process of concentrating phosphatic ores which comprises agitating and aerating an aqueous suspension of said ore in admixture with at least one substance selected from the group consisting of humin obtained as a precipitate in the acid hydrolysis of at least one crude protein, distillates of said humin, organic solvent extracts of said humin and solvent-free extracts thereof, and aqueous extracts of said humin and solvent-free extracts thereof.

2. The process of wet beneficiation of phosphatic ores, which comprises agitating and aerating an aqueous pulp of said ore which has been reagentized with a collector selected from the group consisting of humin obtained as a precipitate in the acid hydrolysis of crude protein, distillates of said humin, organic solvent extracts of said humin and solvent-free extracts thereof, and aqueous extracts of said humin and solvent-free extracts thereof.

3. The process of wet beneficiation of phosphatic ores, which comprises agitating and aerating and aqueous pulp of said ore which has been reagentized with a collector selected from the group consisting of humin obtained as a precipitate in the acid hydrolysis of crude vegetable protein, distillates of said humin, organic solvent extracts of said humin and solvent-free extracts thereof, and aqueous extracts of said humin and solvent-free extracts thereof.

4. The process of wet beneficiation of phosphatic ores, which comprises agitating and aerating an aqueous pulp of said ore which has been reagentized with a collector selected from the group consisting of humin obtained as a precipitate in the acid hydrolysis of crude animal protein, distillates of said humin, organic solvent extracts of said humin and solvent-free extracts thereof, and aqueous extracts of said humin and solvent-free extracts thereof.

5. A process as in claim 2 wherein the said ore is reagentized with a distillate of humin, said humin being obtained as a precipitate in the acid hydrolysis of at least one crude protein.

6. A process as in claim 3 wherein the humin employed is obtained as a precipitate in the acid hydrolysis of corn gluten.

7. A process as in claim 3 wherein the humin employed is obtained as a precipitate in the acid hydrolysis of wheat gluten.

8. The process which comprises agitating and aerating an aqueous pulp suspension of phosphatic ore in admixture with at least one substance selected from the group consisting of humin obtained as a precipitate in the acid hydrolysis of crude protein, distillates of said humin, organic solvent extracts of said humin and solvent-free extracts thereof, and aqueous extracts of said humin and solvent-free extracts thereof, and in admixture with caustic and a hydrocarbon oil and separating the upper layer from the suspension.

9. The process of concentrating pulped non-metallic ores which comprises reagentizing said pulped ore with at least one substance selected from the group consisting of humin obtained as a precipitate in the acid hydrolysis of crude protein, distillates of said humin, organic solvent extracts of said humin and solvent-free extracts thereof, and aqueous extracts of said humin and solvent-free extracts thereof, agitating and aerating the same in aqueous medium and separating the upper layer from the aqueous suspension.

IRA M. LE BARON.
PAUL D. V. MANNING.

REFERENCES CITED

The following references are of record in the file of this patent:

UNITED STATES PATENTS

| Number | Name | Date |
|---|---|---|
| 2,269,958 | Urquhart | Jan. 13, 1942 |
| 2,299,893 | Greene | Oct. 27, 1942 |
| 2,361,057 | Ratzer | Oct. 27, 1942 |

FOREIGN PATENTS

| Number | Country | Date |
|---|---|---|
| 789,280 | France | Aug. 12, 1935 |